(12) United States Patent
Dargent et al.

(10) Patent No.: US 10,859,537 B2
(45) Date of Patent: Dec. 8, 2020

(54) PIEZOELECTRIC TRANSDUCER, MANUFACTURING PROCESS PERTAINING THERETO, AND RESONANT ULTRASOUND SPECTROSCOPY DEVICE

(71) Applicants: SORBONNE UNIVERSITE, Paris (FR); CENTRE NATIONAL DE LA RECHERCHE SCIENTIFIQUE, Paris (FR); INSERM (INSTITUT NATIONAL DE LA SANTE ET DE LA RECHERCHE MEDICALE), Paris (FR)

(72) Inventors: Pascal Dargent, Areines (FR); Quentin Grimal, Paris (FR)

(73) Assignees: SORBONNE UNIVERSITE, Paris (FR); CENTRE NATIONAL DE LA RECHERCHE SCIENTIFIQUE, Paris (FR); INSERM (INSTITUT NATIONAL DE LA SANTE ET DE LA RECHERCHE MEDICALE, Paris (FR)

( * ) Notice: Subject to any disclaimer, the term of this patent is extended or adjusted under 35 U.S.C. 154(b) by 0 days.

(21) Appl. No.: 16/341,491

(22) PCT Filed: Sep. 21, 2017

(86) PCT No.: PCT/EP2017/073904
§ 371 (c)(1),
(2) Date: Apr. 12, 2019

(87) PCT Pub. No.: WO2018/069016
PCT Pub. Date: Apr. 19, 2018

(65) Prior Publication Data
US 2019/0242857 A1 Aug. 8, 2019

(30) Foreign Application Priority Data

Oct. 13, 2016 (FR) ..................... 16 59931

(51) Int. Cl.
*G01N 29/24* (2006.01)
*G01N 29/036* (2006.01)
(Continued)

(52) U.S. Cl.
CPC ........... *G01N 29/245* (2013.01); *G01H 13/00* (2013.01); *G01N 29/036* (2013.01);
(Continued)

(58) Field of Classification Search
CPC .... G01N 29/245; G01N 29/28; G01N 29/043; G01N 29/223; G01N 29/036; G01H 13/00; G10K 11/24
See application file for complete search history.

(56) References Cited

U.S. PATENT DOCUMENTS

| 4,747,192 A | 5/1988 | Rokurota |
| 7,103,960 B2 * | 9/2006 | Aime ................... G10K 11/002 181/171 |

(Continued)

FOREIGN PATENT DOCUMENTS

| EP | 2224237 | 9/2010 |
| WO | 8806927 | 9/1988 |

OTHER PUBLICATIONS

Joseph Rhea Gladden, "Characterization of Thin Films and Novel Materials Using Resonant Ultrasound Spectroscopy," Submitted in Partial Fulfillment of the Degree of Doctor of Philosophy, Aug. 2003, The Pennsylvania State University, The Graduate School, Department of Physics.

(Continued)

*Primary Examiner* — David Z Huang
(74) *Attorney, Agent, or Firm* — Nixon & Vanderhye

(57) ABSTRACT

Disclosed is a piezoelectric transducer of the type including a stack of a contact piece, a piezoelectric pellet and a support of very great stiffness. Specifically, the contact piece forms (Continued)

tips, the respective apex of which constitutes contact points that are spatially isolated from one another. Also disclosed is a process for the manufacture of such a contact piece as well as a resonant ultrasound spectroscopy device including one or more of such piezoelectric transducers.

21 Claims, 4 Drawing Sheets

(51) Int. Cl.
    *G01N 29/22*     (2006.01)
    *G10K 11/24*     (2006.01)
    *G01N 29/04*     (2006.01)
    *G01N 29/28*     (2006.01)
    *G01H 13/00*     (2006.01)

(52) U.S. Cl.
    CPC ......... *G01N 29/043* (2013.01); *G01N 29/223* (2013.01); *G01N 29/28* (2013.01); *G10K 11/24* (2013.01); *G01N 2203/0075* (2013.01); *G01N 2291/014* (2013.01); *G01N 2291/023* (2013.01); *G01N 2291/02827* (2013.01); *G01N 2291/101* (2013.01); *G01N 2291/102* (2013.01); *G01N 2291/265* (2013.01); *G01N 2291/269* (2013.01)

(56) References Cited

U.S. PATENT DOCUMENTS

| | | |
|---|---|---|
| 8,051,715 B2 | 11/2011 | Heck et al. |
| 2006/0218788 A1 | 10/2006 | Boulnois et al. |
| 2010/0212427 A1 | 8/2010 | Heck et al. |
| 2014/0298911 A1* | 10/2014 | Rhodes ................ G01N 29/12 73/579 |

OTHER PUBLICATIONS

International Search Report in corresponding International Application No. PCT/EP2017/073904 dated Dec. 12, 2017.

Masafumi Senoo et al., "Measurement of Elastic Constants of Polycrystals by the Resonance Method in a Cylindrical Specimen", Bulletin of JSME, vol. 27, No. 233, Nov. 1984, pp. 2339-2346, XP055351655.

Hirotsugu Ogi et al., "Complete mode identification for resonance ultrasound spectroscopy", Acoustical Society of America, vol. 112, No. 6, Dec. 2002, pp. 2553-2557.

* cited by examiner

Fig. 7
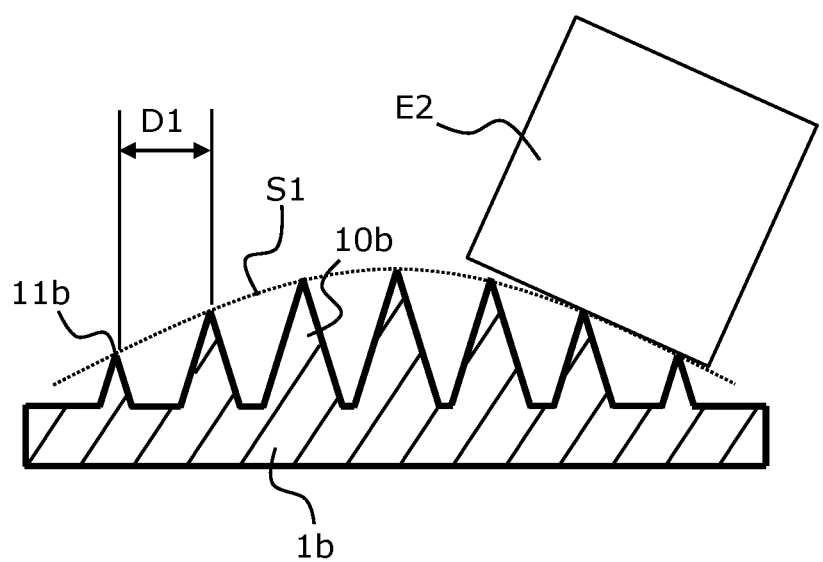
Fig. 8a
Fig. 8b
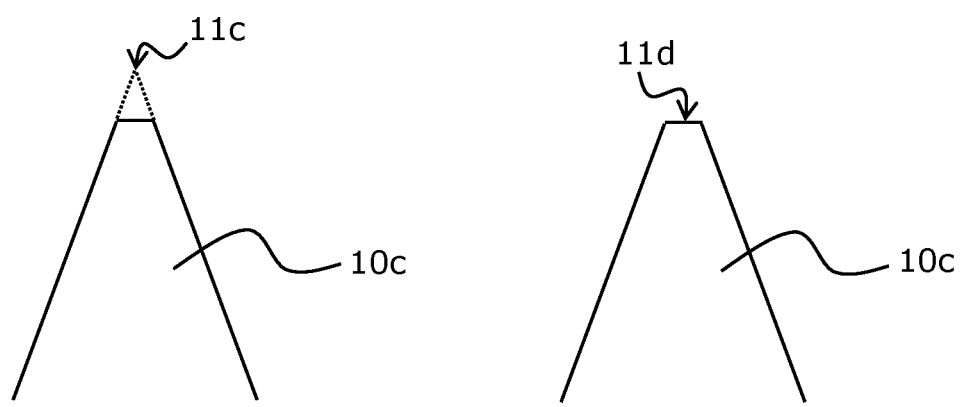

US 10,859,537 B2

PIEZOELECTRIC TRANSDUCER, MANUFACTURING PROCESS PERTAINING THERETO, AND RESONANT ULTRASOUND SPECTROSCOPY DEVICE

TECHNICAL FIELD

The present invention relates to the field of characterization of material, for example, non-limitatively, a bone sample, in particular using resonant ultrasound spectroscopy techniques.

More specifically, the present invention relates to a transducer.

The present invention also relates to a process for the manufacture of such a transducer as well as a resonant ultrasound spectroscopy device comprising one or more transducers according to the invention.

STATE OF THE PRIOR ART

Resonant ultrasound spectroscopy devices are known from the state of the prior art as described in the following documents:

*Characterization of thin films and novel materials using resonant ultrasound spectroscopy*, J. R. Gladden, 2003, hereinafter "Gladden 2003";

*Measurement of elastic constants of polycrystals by the resonance method in a cylindrical specimen*, M. Senoa, T. Nishimura & M. Hirano, Bull. JSME (Japan Soc. Mech'l Engineers), 27, 2239-2346, 1984, hereinafter "Hirano 1984";

*Complete mode identification for resonance ultrasound spectroscopy*, H. Ogi, K. Sato, T. Asada & M. Hirao, J. Acoust. Soc. Am. 112, 2553, 2002, hereinafter "Hirao 2002".

Gladden 2003 describes a device comprising two piezoelectric transducers. Each transducer comprises a contact piece provided with a planar surface. A sample to be analyzed is held between the planar surfaces of the contact pieces of the two transducers.

A drawback of such a device relates to the presence of parasitic modes at medium and low frequencies.

The device in Hirano 1984 also comprises two piezoelectric transducers, each comprising a contact piece provided with a tip. The sample to be analyzed is held between the tips of the two transducers.

The devices according to Gladden 2003 or Hirano 1984 limit the number of degrees of freedom of the sample, which promotes the appearance of rigid modes at low frequencies and shifting of the higher natural frequencies.

Another type of device is described in Hirao 2002, which discloses a system comprising two piezoelectric transducers and a third passive tip. Each transducer comprises a contact piece provided with a tip. The sample to be analyzed is placed in equilibrium on the tips of the two transducers and of the third tip.

A drawback of this type of device consists of the presence of natural modes of the tips themselves.

In addition, this type of device is not suitable for the analysis of samples of small size, typically where the largest dimension is less than 10 mm.

The purpose of the present invention is in particular to propose a piezoelectric transducer and a resonant ultrasound spectroscopy device making it possible to limit the static mechanical constraints applied to the sample and/or allowing and/or facilitating the analysis of a sample of relatively small size and/or with a variable and/or complex geometry.

DISCLOSURE OF THE INVENTION

To this end, the invention proposes a piezoelectric transducer comprising a piezoelectric pellet and a contact piece stacked on the piezoelectric pellet, the contact piece forming tips, the respective apex of which constitutes contact points spatially isolated from one another, this transducer being arranged in order to establish mechanical contact, by at least one of the contact points, with a sample to be analyzed.

Preferably, the contact points can be distributed over a convex surface.

The contact points can thus form a discrete convex surface.

Furthermore, the contact points can be distributed such that no geometrical plane passes through more than three of said contact points, or that no geometrical plane passes less than 0.5 µm from more than three of said contact points.

Such a geometry of the contact points makes it possible to limit the constraints applied to the sample by providing isostatic positioning. For example, if the sample has a planar surface, this planar surface of the sample cannot be placed in contact with more than three contact points of the transducer.

In an embodiment, the tips can have a height comprised between 1 µm and 10 mm, preferably comprised between 20 µm and 3 mm, more preferentially comprised between 50 µm and 1 mm.

In an embodiment, the contact points can be regularly spaced apart with a pitch comprised between 1 µm and 10 mm, preferably comprised between 20 µm and 3 mm, more preferentially comprised between 50 µm and 1 mm.

Such dimensions are in particular suitable for the analysis of samples of relatively small size, and make it possible to push the natural frequencies of the tips beyond the useful pass band of the transducer, typically beyond 1 Mhz.

Preferably, the contact piece can be made from a material the ratio $\sqrt{E_c}/d_c$ of which is greater than 1 GPa$^{1/2}$*cm$^3$/g, preferably greater than 2 GPa$^{1/2}$*cm$^3$/g, more preferentially greater than 2.5 GPa$^{1/2}$*cm$^3$/g, with $E_c$ the Young's modulus of this material and $d_c$ the density of this material.

For example, the contact piece can comprise or consist of polycrystalline diamond and/or polycrystalline cubic boron nitride and/or beryllium and/or aluminium and/or magnesium.

In an embodiment, in a transverse plane, the contact piece forms a radially truncated disk.

Such a truncation frees a space, making it possible to solder electronics connecting wires from the piezoelectric pellet.

The piezoelectric transducer can also comprise a support, and the piezoelectric pellet can be mounted between the support and the contact piece.

Preferably, the support can be made from a material the ratio $\sqrt{E_s}/d_s$ of which is greater than 3 GPa$^{1/2}$*cm$^3$/g, preferably greater than 4 GPa$^{1/2}$*cm$^3$/g, more preferentially greater than 6 GPa$^{1/2}$*cm$^3$/g, with $E_s$ the Young's modulus of this material and $d_s$ the density of this material.

For example, the support can comprise or consist of polycrystalline diamond and/or polycrystalline cubic boron nitride and/or beryllium and/or silicon carbide and/or aluminium.

Such a support makes it possible to stiffen the transducer and to raise the first natural modes typically beyond 1 Mhz.

Preferably, the support is axisymmetric.

On the one hand, an axisymmetric support is easier to produce. On the other hand, this makes it possible to stiffen the transducer uniformly.

Preferably, the cylindrical support has a ratio h/ds comprised between 0.3 and 2, preferably comprised between 0.4 and 1.5, more preferentially comprised between 0.6 and 1, with h the height and ds the diameter of this cylindrical support.

Such dimensions of the cylinder make it possible to increase the value of the first natural frequency optimally, in particular when the support is of the right cylinder type.

According to a variant embodiment, the support can be a sphere truncated axially so as to form a mounting surface, and the piezoelectric pellet can be mounted on this mounting surface.

In order to produce such a spherical support, it is possible to use for example lapped bearing balls made from very hard materials (silicon carbide, etc.). Such bearing balls are commercially available at very low cost.

In an embodiment, the piezoelectric transducer can also comprise:

a bearing element; and one or more positioning elements, this or these positioning elements linking the support and the bearing element and being made from a material the stiffness of which is less than 200 Mpa, preferably less than 50 Mpa, more preferentially less than 10 Mpa.

Preferably, the positioning element(s) can be arranged in order to filter the frequencies of acoustic waves greater than 5 kHz, preferably greater than 1 kHz, more preferably greater than 100 Hz.

This or these positioning elements thus constitute a low-pass (vibration) filter.

Preferably, the piezoelectric transducer can be arranged in order to transmit and/or receive acoustic waves having frequencies comprised between 5 kHz and 1 Mhz, or more broadly comprised between 1 kHz and 10 Mhz, or preferentially yet more broadly comprised between 100 Hz and 100 Mhz.

Such a transducer is therefore suitable for resonant ultrasound spectroscopy.

Preferably, the contact piece can comprise at least nine tips, preferably at least sixteen tips, more preferentially at least twenty-five tips.

According to another aspect, the present invention also relates to a resonant ultrasound spectroscopy device comprising at least one piezoelectric transducer according to a selected combination of the features described above.

Preferably, this spectroscopy device can comprise two piezoelectric transducers according to a selected combination of features described above, and the directions in which the tips of one of said two piezoelectric transducers extend can be:

parallel, or can intersect with the directions in which the tips of the other one of said two piezoelectric transducers extend, the points of intersection of said directions being situated in the direction in which the tips extend from their base to the contact points.

A device comprising two transducers according to the invention makes it possible to analyze samples having variable and/or complex geometry, while limiting the static constraints applied to the sample by careful positioning of the sample on the tips.

According to another aspect, the present invention also relates to a process for the manufacture of a contact piece for a piezoelectric transducer according to a selected combination of the features described above, this process comprising a step of machining the tips by wire electrical discharge machining.

This type of machining makes it possible to produce contact pieces according to the invention with accuracy, in particular for tip dimensions such as those mentioned above.

Preferably, the step of machining the tips can comprise:

a first series of lines cut by electroerosion of the contact piece, parallel to a first axis of erosion, a second series of lines cut by electroerosion of the contact piece, parallel to a second axis of erosion, the first axis of erosion not being parallel to the second axis of erosion.

DESCRIPTION OF THE FIGURES AND EMBODIMENTS

Other advantages and characteristics of the invention will become apparent on reading the detailed description of implementations and embodiments that are in no way limitative, and from the attached figures:

FIG. 7 is a cross section view of a contact piece of a transducer according to the invention;

FIG. 8a and FIG. 8b diagrammatically represent a tip of a contact piece of a transducer according to the invention.

As the embodiments described hereinafter are in no way limitative, variants of the invention can in particular be considered comprising only a selection of the characteristics described, in isolation from the other characteristics described, even if this selection is isolated within a sentence comprising these other characteristics, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

Piezoelectric Transducer

Figure 2:
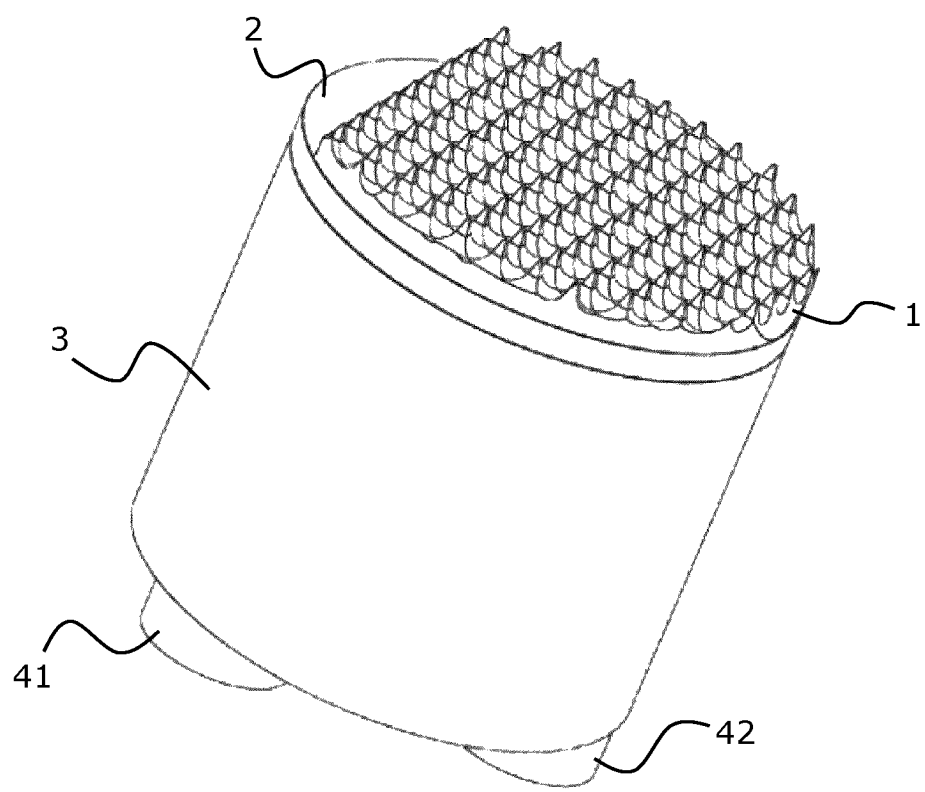
FIG. 2 and FIG. 3 are perspective views of a transducer according to a variant of the invention.
Figure 3:
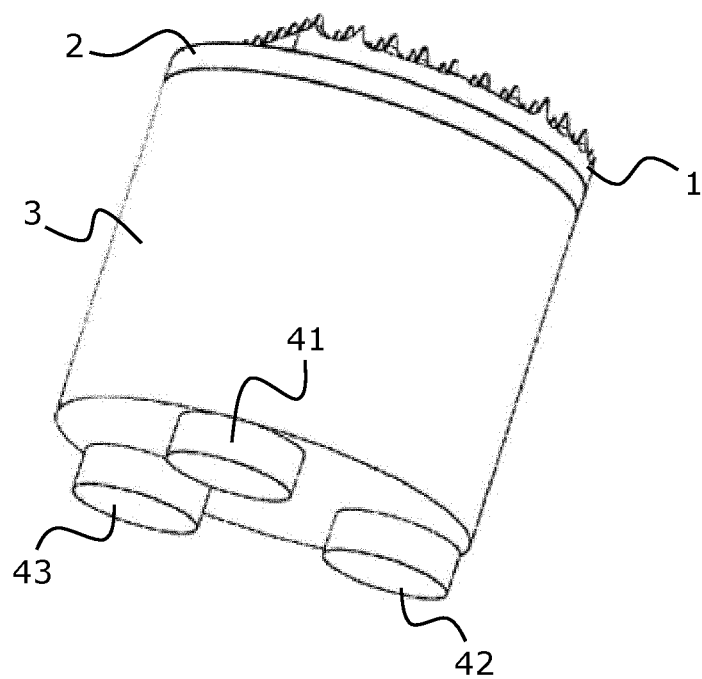
Figure 4:
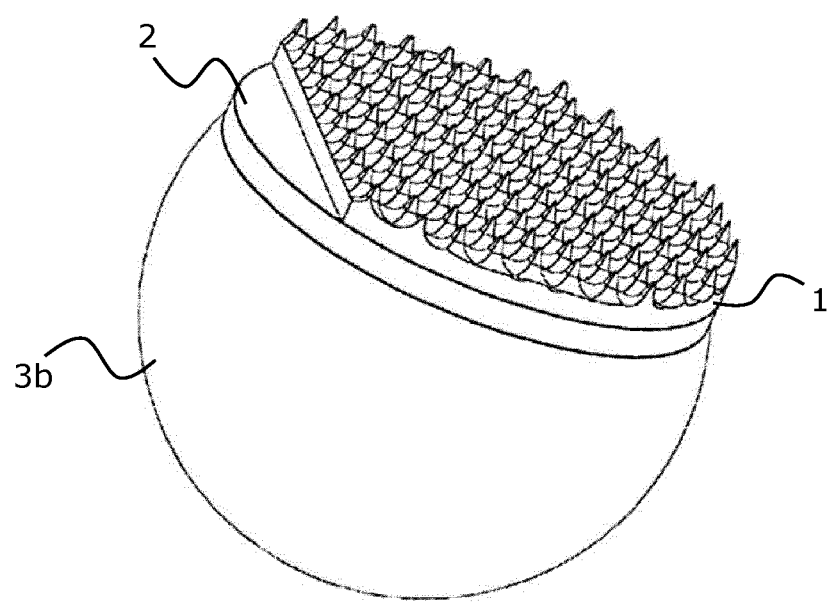
FIG. 4 is a perspective view of a transducer according to another variant of the invention.

FIGS. 2 to 4 show piezoelectric transducers according to the invention. These transducers comprise a stack, typically with bonding, of an axisymmetric support 3, a piezoelectric pellet 2 and a contact piece 1, the piezoelectric pellet 2 being mounted between the support 3 and the contact piece 1.

Transducer Support

The transducer support 3 in FIGS. 2 and 3 is cylindrical and can typically have a ratio h/ds comprised between 0.3 and 2, preferably comprised between 0.4 and 1.5, more preferentially comprised between 0.6 and 1, with h the height (typically comprised between 2 and 20 mm) and ds the diameter (typically comprised between 2 and 30 mm) of this cylindrical support 3.

The support 3b of the transducer in FIG. 4 is a sphere (the diameter typically comprised between 3 and 30 mm) truncated axially. The truncation forms a mounting surface on which is mounted the piezoelectric pellet 2.

From the point of view of the composition of the support 3, the latter can:

- be made from a material the ratio $\sqrt{E_s}/d_s$ of which is greater than 3 GPa$^{1/2}$*cm$^3$/g, preferably greater than 4 GPa$^{1/2}$*cm$^3$/g, more preferentially greater than 6 GPa$^{1/2}$*cm$^3$/g, with $E_s$ the Young's modulus and $d_s$ the density of this material; and/or
- comprise or consist of polycrystalline diamond and/or polycrystalline cubic boron nitride and/or beryllium and/or silicon carbide and/or aluminium.

Contact Piece of the Transducer

Figure 1:
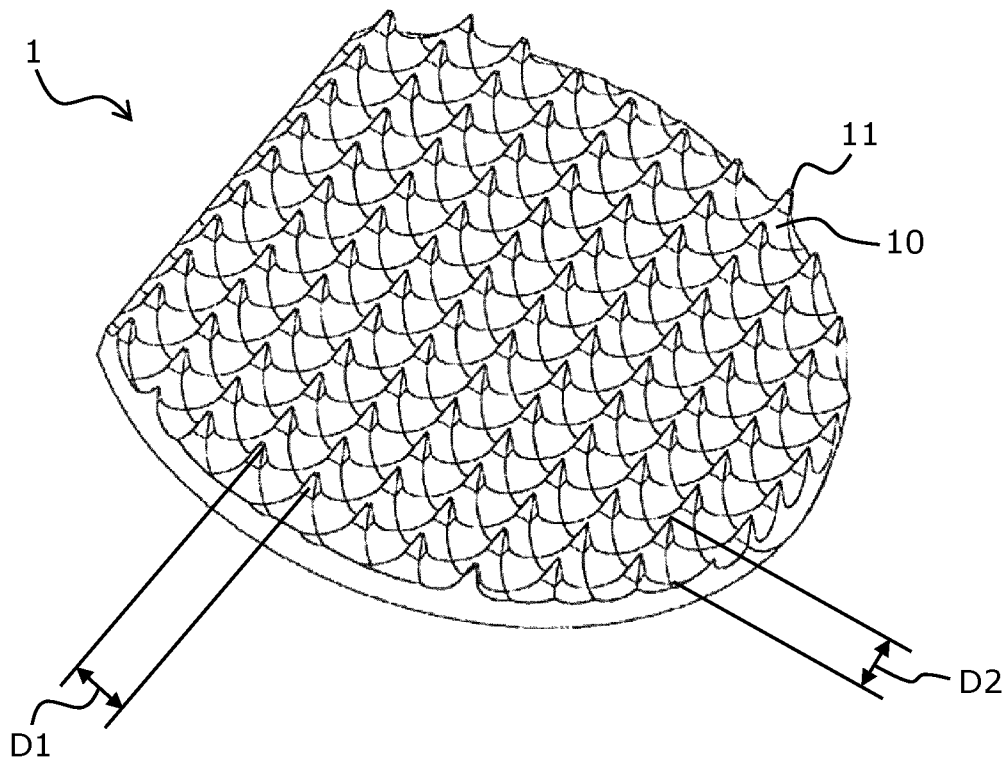
FIG. 1 is a perspective view of a contact piece of a transducer according to the invention.

FIG. 1 shows the contact piece 1 of the transducer in FIGS. 2 to 4.

It can be seen from FIG. 1 that the contact piece 1 forms tips 10 the respective apex of which constitutes contact points 11 spatially isolated from one another.

The contact points 11 of the transducer are provided in order to place the transducer in contact, by a limited number of these contact points 11, with a sample to be analyzed, such as illustrated in FIG. 7. FIG. 7 shows a sample E2 in contact with two contact points 11b of the contact piece 1b.

In other words, the transducer according to the invention is arranged in order to establish a mechanical contact, by at least one of the contact points, with a sample to be analyzed.

Of course, taking account of the known machining techniques, in fact the contact points 11c form not a "tip" as such, but a surface 11d, at least below a certain scale of observation of a tip 10c (see FIGS. 8a and 8b). However, this surface must have negligible dimensions with respect to the dimensions of the transducer.

A distribution of contact points 11b over a convex surface S1 is apparent from FIG. 7.

The surface S1 is called convex because it appears convex when viewed from outside the transducer. In other words, the surface S1 is concave on the side of the tips 10 and convex on the other side.

Thus, the contact points 11 of the contact piece 1 in FIGS. 1 to 4 preferably form a discrete convex surface.

The contact points 11 are distributed such that no geometrical plane passes through more than three of said contact points 11, or no geometrical plane passes less than 0.5 μm from more than three of said contact points 11.

From a dimensional point of view:

- the contact points 11 can be regularly spaced apart with a pitch D1 (preferably, but not necessarily, constant) comprised between 1 μm and 10 mm, preferably comprised between 20 μm and 3 mm, more preferentially comprised between 50 μm and 1 mm, and/or
- the tips 10 can have a height D2 comprised between 1 μm and 10 mm, preferably comprised between 20 μm and 3 mm, more preferentially comprised between 50 μm and 1 mm.

Concerning the composition thereof, the contact piece 1 can:

- be made from a material the ratio $\sqrt{E_c}/d_c$ of which is greater than 1 GPa$^{1/2}$*cm$^3$/g, preferably greater than 2 GPa$^{1/2}$*cm$^3$/g, more preferentially greater than 2.5 GPa$^{1/2}$*cm$^3$/g, with $E_c$ the Young's modulus and $d_c$ the density of this material; and/or
- comprise or consist of polycrystalline diamond and/or polycrystalline cubic boron nitride and/or beryllium and/or aluminium and/or magnesium.

With reference to FIGS. 1 to 6, in a transverse plane, the contact piece 1 forms a radially truncated disk.

Figure 5:
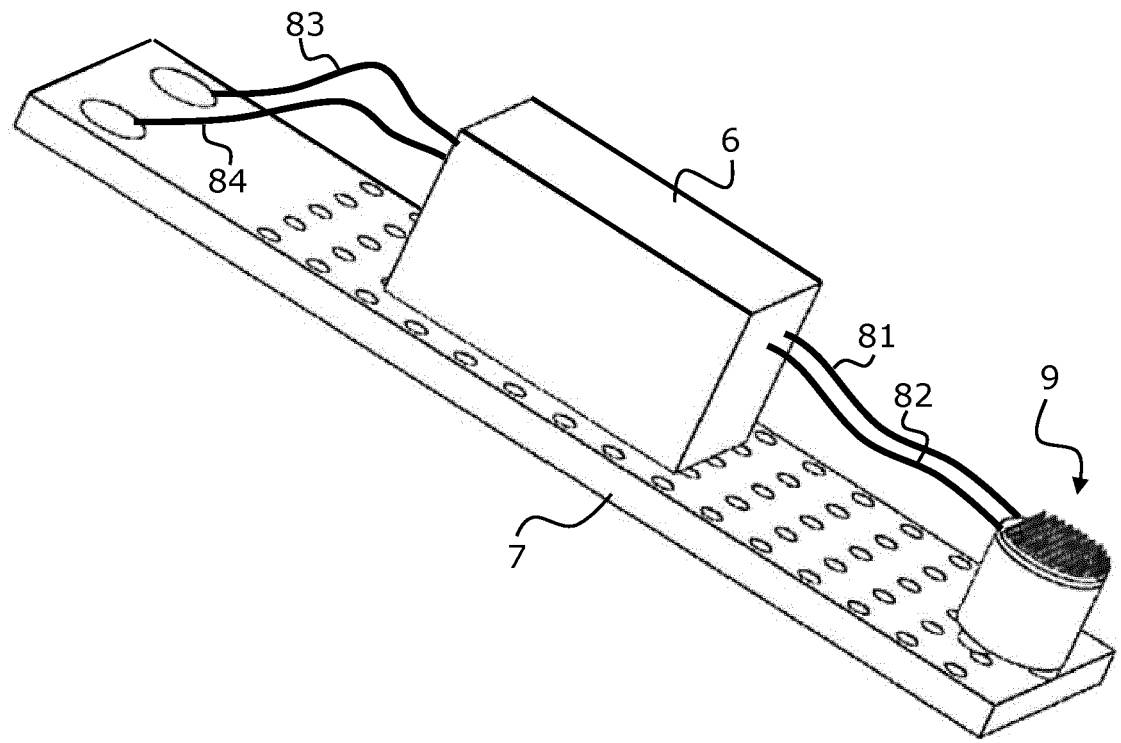
FIG. 5 is a perspective view of a part of a resonant ultrasound spectroscopy device according to the invention, comprising the transducer in FIGS. 2 and 3.

As shown in FIG. 5, such a truncation frees a space and despite the stacking of the piezoelectric pellet 2 with the contact piece 1, makes it possible to solder the cables 81 and 82 onto two terminals of the piezoelectric pellet 2 situated on a top of this pellet, a first one of these terminals being electrically connected to one face of the piezoelectric pellet 2 and a second one of these terminals being electrically connected to the other face of the piezoelectric pellet 2.

The contact piece 1 can comprise at least nine tips, preferably at least sixteen tips, more preferentially at least twenty-five tips.

Piezoelectric Pellet 2

For the pellet 2, typically a PZT (Lead Zirconate Titanate) pellet is used, having a thickness comprised between 0.05 and 3 mm.

Transducer+Support

In the embodiments in FIGS. 2, 3, 5 and 6, the transducer comprises positioning elements 41, 42 and 43, shown in FIG. 3.

Preferably, these positioning elements 41, 42 and 43 can be made from a material the stiffness of which is less than 200 Mpa, preferably less than 50 Mpa, more preferentially less than 10 Mpa, typically comprising or consisting of silicone or polyurethane.

Moreover, these positioning elements 41, 42 and 43 can be arranged in order to filter the frequencies of acoustic waves greater than 5 kHz, preferably greater than 1 kHz, more preferentially greater than 100 Hz. In order to obtain such an arrangement for the filtration of acoustic waves, it is possible for example to use three silicone blocks of diameter 1.5 mm and thickness 0.5 mm, inasmuch as the transducer has a weight of the order of 0.3 grams.

With reference to FIG. 5, the transducer 9 is typically mounted on a bearing element 7 by the positioning elements 41, 42 and 43.

The bearing element 7 is for example a printed circuit board made from epoxy resin of the FR-4 type.

Typically, the piezoelectric pellet of the transducer 9 is connected to an impedance matching module 6, typically of 50 Ohms, by wires 81 and 82. Wires 83 and 84 connect this module 6 to fastening points of the circuit board 7.

Resonant Ultrasound Spectroscopy Device

Figure 6:
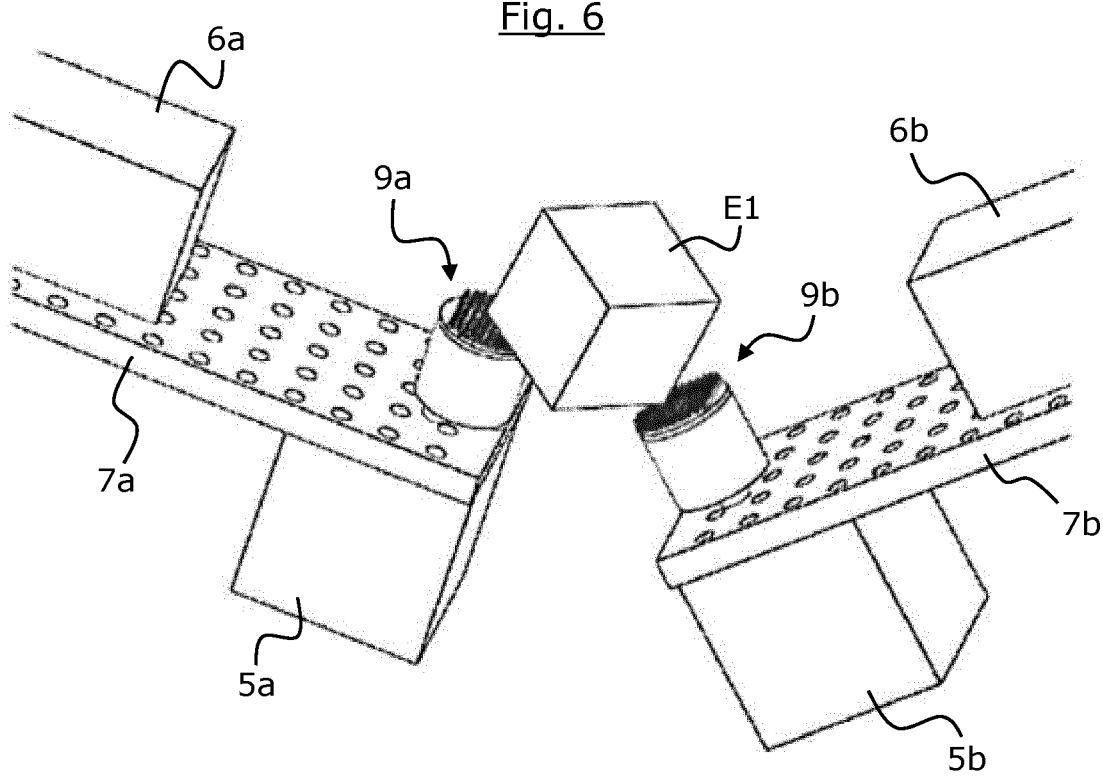
FIG. 6 is a partial perspective view of a resonant ultrasound spectroscopy device according to the invention, comprising two transducers.

FIG. 6 represents a resonant ultrasound spectroscopy device according to the invention.

A sample E1 to be analyzed is positioned on two piezoelectric transducers 9a and 9b having a cylindrical overall shape, according to the transducer in FIGS. 2 and 3.

Typically, one of the transducers, 9a, operates as a transmitter and the other, 9b, as a receiver.

The two transducers 9a and 9b are arranged so that they do not pinch the sample between them, which increases the number of degrees of freedom of the sample E1 by comparison with the devices of the state of the prior art such as those described in Gladden 2003 and Hirano 1984.

The relative positioning of the two transducers 9a and 9b, at angles and distance, must be adjusted as a function of the size and shape of the sample E1.

In the case illustrated in FIG. 6, the direction in which one of the transducers, 9a, extends intersects with the direction in which the other transducer, 9b, extends. In other words, the axis of the cylindrical support of the transducer 9a intersects with the axis of the cylindrical support of the transducer 9b.

In other words, the directions in which the tips of the transducer 9a extend intersect with the directions in which the tips of the transducer 9b extend.

Moreover, the points of intersection of said directions are situated in the direction in which the tips extend from their base to the contact points.

Preferably, a weight, respectively 5a and 5b, is mounted on each of the bearing elements 7a and 7b on the opposite side with respect to the respective transducer 9a and 9b.

The weights 5a and 5b can be made from lead and can be positioned and present a weight and a shape suitable for stabilizing the transducers 9a and 9b by inertia.

These weights 5a and 5b are also useful for reducing the natural frequencies of the bearing element 7.

Preferably, the piezoelectric transducers 9a and 9b can be arranged in order to transmit and/or receive acoustic waves having frequencies comprised between 5 kHz and 1 Mhz, preferably comprised between 1 kHz and 10 Mhz, more preferentially comprised between 100 Hz and 100 Mhz.

Process for the Manufacture of the Contact Piece

The contact piece 1 is preferably manufactured by a process implementing a step of machining the tips 10 by wire electrical discharge machining, comprising:

a first series of lines cut by electroerosion of the contact piece 1, parallel to a first axis of erosion, a second series of lines cut by electroerosion of the contact piece 1, parallel to a second axis of erosion, the first axis of erosion not being parallel to the second axis of erosion.

In the example in FIG. 1, it is apparent that the contact piece 1 has been machined with a second axis of erosion perpendicular to the first axis of erosion.

Of course, the invention is not limited to the examples that have just been described, and numerous modifications may be made to these examples without exceeding the scope of the invention. For example:

the contact piece 1 can have a truncation different from that shown in FIGS. 1 to 6, or not have any truncation, in particular if the axisymmetric support and the contact piece are electrically conductive;

the support can have any axisymmetric shape, for example with parabolic generatrices, making it possible to further improve the performance of the first natural frequency.

In addition, the different characteristics, forms, variants and embodiments of the invention may be combined together in various combinations to the extent that they are not incompatible or mutually exclusive.

The invention claimed is:

1. A piezoelectric transducer (9, 9a, 9b) comprising:
a piezoelectric pellet (2); and
a contact piece (1) stacked on the piezoelectric pellet (2), wherein the contact piece (1) forms tips (10),
the respective apex of the tips (10) constituting contact points (11) spatially isolated from one another, and
wherein the contact piece is arranged in order to establish a mechanical contact, by at least one of the contact points (11), with a sample (E1) to be analyzed,
wherein the contact points (11) are distributed over a convex surface (S1).

2. The piezoelectric transducer according to claim 1, wherein the tips (10) have a height (D2) comprised between 1 μm and 10 mm.

3. The piezoelectric transducer according to claim 1, wherein the contact points (11) are regularly spaced apart with a pitch (D1) comprised between 1 μm and 10 mm.

4. The piezoelectric transducer according to claim 1, wherein the contact piece (1) is made from a material the ratio $\sqrt{E_c}/d_c$ of which is greater than 1 GPa$^{1/2}$*cm$^3$/g, with $E_c$ the Young's modulus and $d_c$, the density of this material.

5. The piezoelectric transducer according to claim 1, wherein the contact piece (1) comprises or consists of polycrystalline diamond and/or polycrystalline cubic boron nitride and/or beryllium and/or aluminium and/or magnesium.

6. The piezoelectric transducer according to claim 1, wherein, in a transverse plane, the contact piece (1) forms a radially truncated disk.

7. The piezoelectric transducer according to claim 1, further comprising a support (3, 3b) and wherein the piezoelectric pellet (2) is mounted between the support (3, 3b) and the contact piece (1).

8. The piezoelectric transducer according to claim 7, wherein the support (3, 3b) is made from a material the ratio $\sqrt{E_s}/d_s$ of which is greater than 3 GPa$^{1/2}$*cm$^3$/g, with $E_s$ the Young's modulus and $d_s$, the density of this material.

9. The piezoelectric transducer according to claim 7, wherein the support (3, 3b) comprises or consists of polycrystalline diamond and/or polycrystalline cubic boron nitride and/or beryllium and/or silicon carbide and/or aluminium.

10. The piezoelectric transducer according to claim 7, wherein the support (3) is axisymmetric.

11. The piezoelectric transducer according to claim 10, wherein the support (3) is a cylindrical support (3) and the cylindrical support (3) has a ratio $h/d_s$ comprised between 0.3 and 2, with h the height and $d_s$ the diameter of this cylindrical support.

12. The piezoelectric transducer according to claim 10, wherein the support (3, 3b) is a sphere (3b) truncated axially so as to form a mounting surface, and wherein the piezoelectric pellet (2) is mounted on the mounting surface.

13. The piezoelectric transducer according to claim 7, further comprising:
a bearing element (7, 7a, 7b), and
one or more positioning elements (41, 42, 43),
this or these positioning elements (41, 42, 43) linking the support and the bearing element (7, 7a, 7b) and being made from a material the stiffness of which is less than 200 Mpa.

14. The piezoelectric transducer according to claim 13, wherein the positioning element(s) (41, 42, 43) is (are) arranged in order to filter the frequencies of acoustic waves greater than 5 kHz.

15. The piezoelectric transducer according to claim 1, wherein the piezoelectric transducer is arranged in order to transmit or receive acoustic waves having frequencies comprised between 5 kHz and 1 Mhz.

16. The piezoelectric transducer according to claim 1, wherein the contact piece (1) comprises at least nine tips (10).

17. A resonant ultrasound spectroscopy device comprising at least one piezoelectric transducer (9, 9a, 9b) according to claim 1.

18. The resonant ultrasound spectroscopy device according to claim 17, comprising two of the piezoelectric transducers (9a, 9b), wherein the directions in which the tips of one (9a) of said piezoelectric transducers extend are:
parallel, or
intersect with the directions in which the tips of the other (9b) one of said two piezoelectric transducers extend, the points of intersection of said directions being situated in the direction in which the tips extend from their base to the contact points.

19. A piezoelectric transducer (9, 9a, 9b) comprising:
a piezoelectric pellet (2); and
a contact piece (1) stacked on the piezoelectric pellet (2),
wherein the contact piece (1) forms tips (10),
the respective apex of the tips (10) constituting contact points (11) spatially isolated from one another,
wherein the contact piece is arranged in order to establish a mechanical contact, by at least one of the contact points (11), with a sample (E1) to be analyzed, and
wherein the contact points (11) are distributed such that no geometrical plane passes less than 0.5 μm from more than three of said contact points.

20. A process for the manufacture of a contact piece (1) for a piezoelectric transducer (9, 9a, 9b) comprising a piezoelectric pellet (2) and a contact piece (1) stacked on the piezoelectric pellet (2), wherein the contact piece (1) forms tips (10), the respective apex of the tips (10) constituting contact points (11) spatially isolated from one another, and wherein the contact piece is arranged in order to establish a mechanical contact, by at least one of the contact points (11), with a sample (E1) to be analyzed, the process comprising a step of machining the tips (10) by wire electrical discharge machining.

21. The process according to claim 20, wherein the step of machining the tips (10) comprises:
a first series of lines cut by electroerosion of the contact piece (1), parallel to a first axis of erosion,
a second series of lines cut by electroerosion of the contact piece (1), parallel to a second axis of erosion,
the first axis of erosion not being parallel to the second axis of erosion.

* * * * *